United States Patent Office 2,983,911
Patented May 9, 1961

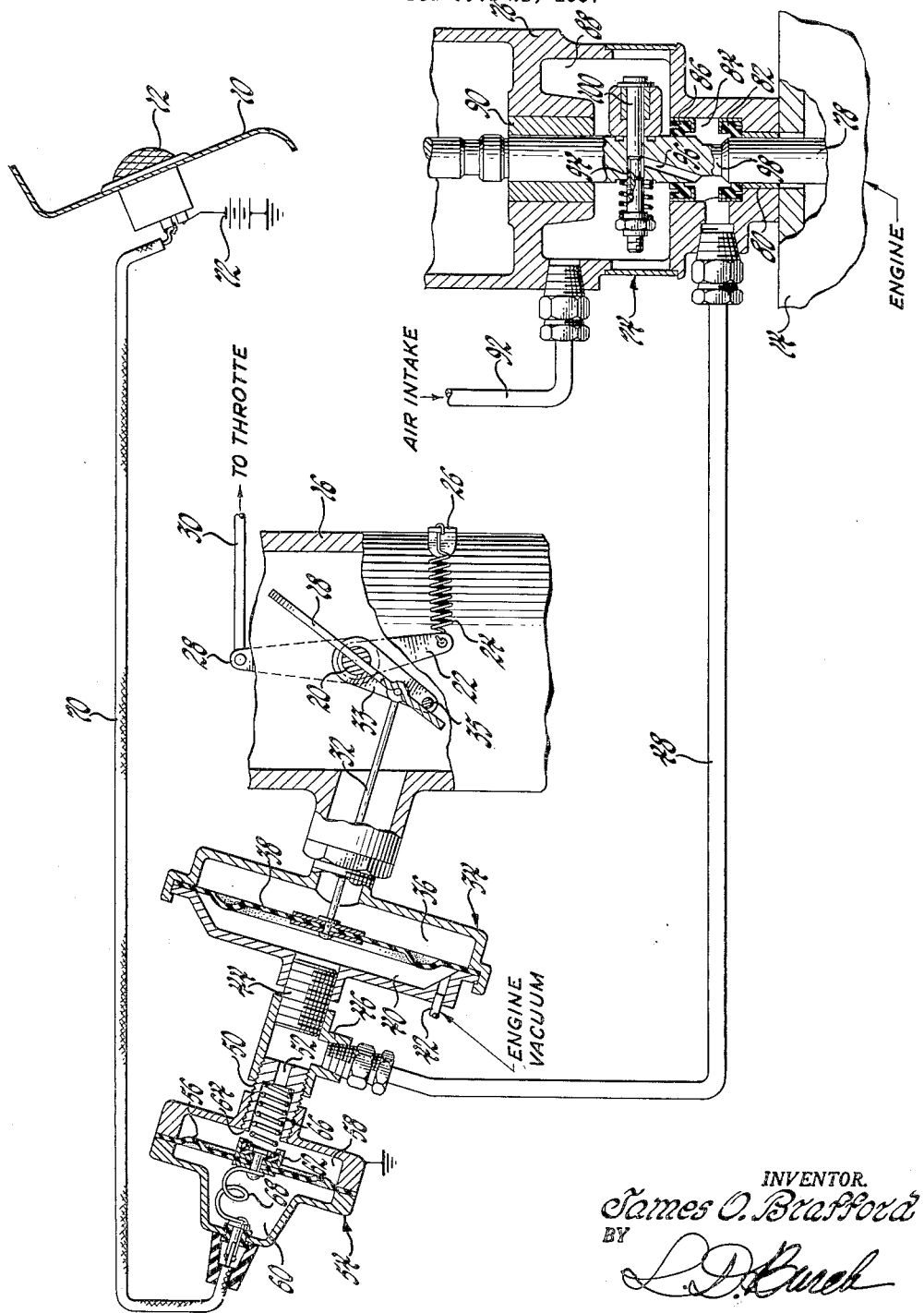

2,983,911

ENGINE SPEED WARNING SYSTEM

James O. Brafford, Pontiac, Mich., assignor to General Motors Corporation, Detroit, Mich., a corporation of Delaware Filed Oct. 21, 1957, Ser. No. 691,292

3 Claims. (Cl. 340—264)

The invention relates to a speed warning system for an internal combustion engine and more particularly to such a system for use on automotive vehicles. It is common practice to provide the internal combustion engines of vehicles such as trucks and buses with a maximum speed governor to prevent damage to the engine by inadvertent overspeeding as well as to limit the maximum vehicle speed. The invention is illustrated as being used in combination with such a governor. A governor of this type is disclosed in U.S. application Serial No. 470,201, filed November 22, 1954, now Patent Number 2,828,725, and assigned to the common assignee. A governor of this type may be actuated by vacuum which is induced only when the engine being governed reaches a predetermined speed. When the vacuum is induced, the governor causes the engine throttle valve to be moved toward the closed throttle position, thereby preventing the engine from overspeeding under power.

While these governors are very effective in regulating the maximum engine speed during loaded conditions, they cannot effectively regulate engine speed during overrunning conditions. Such conditions are often encountered when the vehicle is moving on a downgrade. The weight of the vehicle, particularly heavily loaded vehicles such as trucks, causes the vehicle to increase in speed, thereby driving the vehicle engine at an increased speed. It is common practice for the operator of the vehicle to shift the vehicle transmission to a lower gear to utilize the increased engine braking obtainable at higher engine speeds as an aid in controlling the vehicle speed on the grade. It is obvious that operation in this manner will cause the vehicle engine to be driven at even higher speeds than when lower gear ratios are used. The engine is thus very likely to exceed the maximum desirable speed consistent with safe engine operation. Sustained excessive engine speeds are also likely to damage the engine and result in the necessity for costly repairs.

The warning system embodying the invention provides an indication to the vehicle operator that the engine has reached the speed at which it is normally governed under power and he can therefore act accordingly. In order to prevent excessive speeds being realized, he can decrease the vehicle speed by application of the vehicle brakes and, if necessary, use the brakes to a greater extent while upshifting the vehicle transmission to prevent the engine from running at such speeds. The warning indicator is preferably actuated by the same vacuum forces which actuate the maximum speed governor. The indicator may be of any desirable type such as an audio signal or may take the form of visual signal such as a light on the vehicle instrument panel or other convenient location.

In the drawing the single figure shows an engine speed warning system embodying the invention, the system being illustrated diagramamtically in portions and having parts broken away and in section.

Referring now to the drawing, in which only the minimum necessary portions of a vehicle and vehicle engine are illustrated, the vehicle instrument panel 10 has an indicator light 12 mounted thereon. This light is energized to indicate the fact that the vehicle engine has attained the maximum governed speed. The vehicle engine 14 is provided with an engine air intake 16 in which is mounted a throttle valve 18 on a rotatable throttle valve shaft 20 passing transversely through intake 16.

Throttle valve shaft 20 may have a biased arm 22 secured therethrough which has one end of a spring 24 attached to its outer end. The other end of this spring is secured to a relatively unmovable portion 26 of the engine. Spring 24 is preferably of the tension type and may tend to hold throttle valve 18 in the open position. A lever 28 may also be secured to shaft 20 and have a throttle rod 30 connected thereto which is controlled by the vehicle operator to position the throttle valve 18 as desired. A governor rod 32 may also be connected to actuate throttle valve 18 through rotatable arm 33 and pin 35 to urge the valve to a closed position when the engine reaches the maximum desired speed.

Rod 32 is actuated by a motor 34 which may be of the vacuum powered diaphragm type. Motor 34 includes an enclosed chamber having one section which may be at substantially atmospheric pressure at all times. The chamber 36 is divided by diaphragm 38 to define section 36 and a vacuum section 40. Outlet 42 may connect vacuum section 40 with the engine at the intake air venturi to permit engine vacuum to be established at this point in the manner to be described. A conduit connection such as nipple 44 may connect section 40 with a T 46. One leg of T 46 is connected with a vacuum line 48. The remaining leg of T 46 is connected through an adaptor 50 having a passage 52 therein to a vacuum actuated switch motor 54. Switch motor 54 has a chamber divided into two sections by diaphragm 56. The section 58 to which passage 52 is connected is subject to vacuum induced in line 48 at the same time that section 40 of the governor motor 34 is subject to that vacuum. The other section 60 of motor 54 may be subject to atmospheric pressure or other predetermined pressure having a value substantially higher than the vacuum normally induced in line 48. Switch motor 54 also contains the contacts 62 and 64 constituting an electric switch. Contact 62 is preferably mounted on diaphragm 56, thereby being electrically insulated from the walls defining the motor chamber. Contact 64 may be formed from the end of adaptor 50 if desired or may take the form of a separate contact mounted at this point. Diaphragm 56 is biased away from adaptor 50 by spring 66 so that contact 62 and 64 are normally held apart. A flexible wire 68 may connect contact 62 with wire 70 which forms a portion of the circuit used to energize indicator light 12. Any convenient source of electricity such as the vehicle battery or generator 72 may be used to complete components of the circuit. A manual switch may be provided in the circuit to open it whenever the operator desires to do so. It is preferred to provide no such switch however, since its presence may encourage the operator to cut out the warning device or may be accidentally left open.

The governor diaphragm 38 and the switch diaphragm 56 are actuated when vacuum is induced in line 48. Vacuum is induced in this line only when the engine has reached the maximum engine speed desired. This is acomplished by the governor control 74. This governor control is illustrated as being built within the distributor case 76 and being operated by the distributor drive shaft 78. Drive shaft 78 is driven from the engine crankshaft or camshaft as desired through appropriate gearing, etc., so that the speed of the shaft 78 is in direct proportion to the speed of the engine. Shaft 78 extends through bearing 80 and seal 82 which are positioned in the lower end of the case 76. A portion of the shaft beyond seal 82 passes through vacuum chamber 84, through a second seal 86 and through governor chamber 88. It then extends through bearing and seal 90 into the distributor portion of casing 76. An air inlet line 92 is provided to permit atmospheric air to be brought into governor chamber 88. Shaft 78 is provided with a transversely extending passage 94 and a generally longitudinally extending passage 96 which connects passage 94 with vacuum chamber 84. Passage 96 may be slightly diagonal if desired and terminate at a decreased portion 98 of shaft 78 which is located within chamber 84. A weighted and spring biased governor valve 100 is positioned in transverse passage 94 to control the admission of atmospheric air to chamber 84 by controlling the opening to passage 96.

So long as the engine is operating at a speed less than that set by adjustment of maximum speed governor valve 100, this valve will remain in substantially the position shown in the drawing. When this speed is reached, the centrifugal force of the weighted portion of the valve overcomes the spring force exerted against the valve, permitting the valve to move to the right relative to the position shown in the drawing. The valve thus substantially cuts off the supply of atmospheric air through chamber 84 through passage 96 to induce a vacuum pressure substantially equal to engine vacuum in chamber 84 and conduit 48. This vacuum pressure is sufficient to actuate motors 34 and 54, thereby actuating governor rod 32 to close the throttle valve 18 and closing contact 62 and 64 to energize indicator light 12. Additional details of operation of the governor mechanism including the governor valve are found in the above identified application.

An engine speed warning system has thus been provided which indicates to the vehicle operator the fact that the maximum speed at which the engine is governed under power has been reached or exceeded when the vehicle is travelling on a downgrade. The indicator will also remind the operator that he is operating at governed speed when he is operating the engine under normal driving conditions. Since the warning light or audio signal is connected to operate concurrently with the engine governor, it provides a positive indication of the engine speed with a minimum of additional materials being required beyond the installations already found on many such engines. It therefore results in a positive and economical warning system which will aid the driver in proper operation and care of the vehicle.

What is claimed is:

1. Mechanism for warning an engine operator of the attainment of engine governed speed, said mechanism comprising a vacuum actuated engine overspeed governor having means sensitive to engine speed and actuable at a predetermined engine speed to govern the engine at that speed, a vacuum actuable switch interconnected therewith for actuation concurrently with actuation of said governor, and an electric circuit including warning means and said switch for controlling said circuit, said warning means therefore being actuated concurrently with actuation of said governor.

2. In combination in an internal combustion engine, an engine overspeed governor and indicator mechanism for indicating actuation of said governor, said governor and indicator mechanism comprising a conduit connected with the air intake of said engine, an air intake for said conduit, speed sensitive means for substantially closing said conduit air intake at a predetermined maximum engine speed whereby vacuum is introduced in said conduit, a governor controlled fluid motor connected with said conduit and actuable by vacuum therein to restrict said engine to said predetermined maximum speed, an indicator fluid motor connected with said conduit and actuable by vacuum therein concurrently with said governor motor, and indicator means actuable by said indicator motor.

3. An engine speed warning system for an internal combustion engine having a maximum speed governor, said system comprising, a governor valve chamber, an air intake connected with said chamber, a drive shaft driven by said engine and extending into said chamber, an air outlet in said drive shaft, a governor valve sensitive to speed of said shaft and mounted therein and controlling said air outlet, a governor controlled fluid motor, a first air conduit connecting said motor and said controlled air outlet, a second air conduit connecting said motor with the air intake of said engine, a second fluid motor operatively connected with one of said conduits, an electric circuit having an electrical switch therein controlled by said second motor to energize said circuit, and warning means in said circuit and energized only when said governor valve substantially closes said chamber air outlet to induce vacuum pressure in said conduits to concurrently actuate said motors.

References Cited in the file of this patent

UNITED STATES PATENTS

| | | |
|---|---|---|
| 490,684 | Schilling et al. | Jan. 31, 1893 |
| 1,122,181 | Wheeler | Dec. 22, 1914 |
| 1,267,633 | Clift | May 28, 1918 |
| 1,620,493 | Schindler | Mar. 8, 1927 |
| 1,843,960 | Sticelber | Feb. 9, 1932 |
| 2,131,264 | Benjamin | Sept. 27, 1938 |
| 2,260,576 | Maybach | Oct. 28, 1941 |
| 2,692,980 | Platt | Oct. 26, 1954 |
| 2,773,251 | Snyder | Dec. 4, 1956 |